(12) United States Patent
Dai et al.

(10) Patent No.: US 11,501,594 B2
(45) Date of Patent: Nov. 15, 2022

(54) VENDING MACHINE AND VENDING METHOD AND VENDING SYSTEM THEREFOR

(71) Applicants: HEFEI MIDEA INTELLIGENT TECHNOLOGIES CO., LTD, Anhui (CN); HEFEI HUALING CO., LTD., Anhui (CN)

(72) Inventors: Jiang Dai, Anhui (CN); Tao Ji, Anhui (CN); Jielong Zhang, Anhui (CN); Xiufeng Lv, Anhui (CN)

(73) Assignees: HEFEI MIDEA INTELLIGENT TECHNOLOGIES CO., LTD, Anhui (CN); HEFEI HUALING CO., LTD., Anhui (CN)

( * ) Notice: Subject to any disclaimer, the term of this patent is extended or adjusted under 35 U.S.C. 154(b) by 120 days.

(21) Appl. No.: 16/966,435

(22) PCT Filed: Jan. 23, 2019

(86) PCT No.: PCT/CN2019/072838
§ 371 (c)(1),
(2) Date: Jul. 30, 2020

(87) PCT Pub. No.: WO2019/154087
PCT Pub. Date: Aug. 15, 2019

(65) Prior Publication Data
US 2021/0035399 A1    Feb. 4, 2021

(30) Foreign Application Priority Data

Feb. 8, 2018  (CN) .......................... 201810130405.5
Feb. 8, 2018  (CN) .......................... 201820228875.0

(51) Int. Cl.
*G07F 9/00* (2006.01)
*G01G 19/414* (2006.01)
(Continued)

(52) U.S. Cl.
CPC ........... *G07F 9/002* (2020.05); *G01G 19/414* (2013.01); *G06K 7/1417* (2013.01); *G06Q 20/18* (2013.01); *G07C 9/00571* (2013.01); *G07F 11/06* (2013.01)

(58) Field of Classification Search
CPC ........ G07F 11/62; G07F 9/026; G06Q 10/087
(Continued)

(56) References Cited

U.S. PATENT DOCUMENTS 6,707,381 B1    3/2004  Maloney
9,349,238 B2 *  5/2016  Tkachenko ............. G07F 9/026
(Continued)

FOREIGN PATENT DOCUMENTS

CN    105427459 A    3/2016
CN    106920152 A    7/2017
(Continued)

*Primary Examiner* — Timothy R Waggoner
(74) *Attorney, Agent, or Firm* — Seed IP Law Group LLP

(57) ABSTRACT

A vending machine (100) and a vending method and vending system (1000) therefor, the vending machine (100) comprising a machine body (10), a door body (20), and at least one layer of shelves (30) and a weighing device (40) that are installed inside the machine body (10). The vending method comprises: collecting the weight of products on a shelf before and after vending (S1); calculating the difference of the change between the weight of the products on the shelf before vending and the weight of the products on the shelf after vending (S2); and if the difference of the change is less than a first weight change threshold, issuing an alarm prompt (S3), wherein the first weight change threshold is less than or equal to zero. Using the present invention may promptly determine the misplacement and replacement of the products without relying on an RFID tag.

16 Claims, 4 Drawing Sheets

(51) Int. Cl.
*G06K 7/14* (2006.01)
*G06Q 20/18* (2012.01)
*G07C 9/00* (2020.01)
*G07F 11/06* (2006.01)

(58) Field of Classification Search
USPC .......................................................... 700/236
See application file for complete search history.

(56) References Cited

U.S. PATENT DOCUMENTS

| | | | |
|---|---|---|---|
| 10,268,983 B2 | 4/2019 | Kumar et al. | |
| 10,282,720 B1* | 5/2019 | Buibas | G07F 19/207 |
| 10,810,540 B1* | 10/2020 | Gopal | G01G 19/42 |
| 2007/0050271 A1 | 3/2007 | Ufford et al. | |
| 2008/0103939 A1* | 5/2008 | Gibb | G07F 5/18 |
| | | | 705/28 |
| 2011/0301749 A1* | 12/2011 | Hammonds | G07F 11/38 |
| | | | 700/240 |
| 2012/0120327 A1 | 5/2012 | Marx et al. | |
| 2014/0110584 A1 | 4/2014 | Campbell | |
| 2014/0316916 A1* | 10/2014 | Hay | G07G 1/0036 |
| | | | 705/17 |
| 2015/0115029 A1 | 4/2015 | Rahim et al. | |
| 2016/0283898 A1 | 9/2016 | Reuther et al. | |
| 2017/0344935 A1 | 11/2017 | Mattingly et al. | |
| 2020/0273011 A1* | 8/2020 | Winsor | G06Q 30/0639 |

FOREIGN PATENT DOCUMENTS

| | | |
|---|---|---|
| CN | 107274555 A | 10/2017 |
| CN | 107481414 A | 12/2017 |
| CN | 108335406 A | 7/2018 |
| JP | 2009169760 A | 7/2009 |
| JP | 2016521414 A | 7/2016 |
| JP | 2016532932 A | 10/2016 |

* cited by examiner

VENDING MACHINE AND VENDING METHOD AND VENDING SYSTEM THEREFOR

CROSS-REFERENCE TO RELATED APPLICATIONS

This application claims priority to and benefits of Chinese Patent application Serial Nos. 201810130405.5 and 201820228875.0, both filed on Feb. 8, 2018, the entire content of which is incorporated herein by reference.

FIELD

The present disclosure relates to the field of intelligent device technology, and particularly relates to a vending method for a vending machine, a vending machine and a vending system.

BACKGROUND

In an existing vending machine, an RFID (Radio Frequency Identification) electronic tag needs to be attached to each product, and the product is identified by scanning the electronic tag. Although this method is simple and convenient in operation, the cost of the electronic tag is too high. Therefore, this method still cannot be popularized.

In some related techniques, a weight sensor is installed to a shelf, and pricing is performed by detecting a weight change of a product on the shelf before and after the product is taken away by a customer. However, this method has some problems. If the customer intentionally or unintentionally places a product belong to shelf A into a product area with a different price of shelf B during purchasing, the system will suffer from a pricing error, and the system cannot judge and find this problem in time. Further, if the product stays on a wrong shelf, a pricing error will happen to other customers coming to purchase thereafter, and the whole pricing system will be disordered. Moreover, if the product is underpriced, the benefit of a merchant will be harmed; if the product is overpriced, the user experience will be poor, and even cause user complaints.

In other related techniques, an infrared emitter and an infrared receiver are installed above and below the shelf, respectively, and through infrared induction, whether there are products arranged currently on the shelf is judged, but whether a product is replaced from a position A to a position B cannot be judged. To further judge whether a product is replaced, in this method, an RFID electronic tag is attached to each product, but the cost of the RFID tag is too high, so that this method cannot be widely popularized at present.

SUMMARY

Embodiments of the present disclosure seek to solve at least one of the problems existing in the related art to at least some extent.

Accordingly, a first objective of the present disclosure is to provide a vending method for a vending machine, which is capable of determining whether a product is misplaced or replaced without relying on an RFID tag, thereby guaranteeing benefits of merchants and users.

A second objective of the present disclosure is to provide a non-transitory computer readable storage medium.

A third objective of the present disclosure is to provide a vending machine.

A fourth objective of the present disclosure is to provide a vending system.

In order to achieve the above objectives, embodiments of a first aspect of the present disclosure provide a vending method for a vending machine. The vending machine includes a machine body, a door body, at least one shelf installed inside the machine body, and a weighing device. The vending method includes: acquiring weight of a product on the shelf before and after vending; and issuing an alarm prompt when it is detected and confirmed that a weight change is less than a first weight change threshold, in which the weight change is a difference between the weight of the product on the shelf before vending and the weight of the product on the shelf after vending, and the first weight change threshold is less than or equal to zero.

With the vending method for the vending machine according to embodiments of the present disclosure, whether there is a product being misplaced or replaced is determined based on the weight change of the product before and after vending, without relying on an RFID tag of the product, and the alarm prompt is issued in time, so that a correct execution of a subsequent vending process may be ensured, a disordered pricing is avoided, and benefits of merchants and users are guaranteed. Moreover, the vending method is simple and easy to popularize.

In some embodiments of the present disclosure, the vending machine further includes an imaging device, and the vending method further includes: capturing images of the product on the shelf before and after vending; and issuing an alarm prompt when it is detected and confirmed according to the images before and after vending that the product on the shelf increases.

In some embodiments of the present disclosure, the vending method further includes: confirming that the weight change is greater than a second weight change threshold, obtaining first vending information according to the weight change, in which the second weight change threshold is greater than or equal to zero; detecting and confirming according to the images before and after vending that the product on the shelf decreases, obtaining second vending information according to a change of the images; and issuing an alarm prompt when it is confirmed that the first vending information is inconsistent with the second vending information. Through a dual comparison of weighing and image recognition, the vending method is safer and more reliable.

In some embodiments of the present disclosure, it is confirmed that the first vending information is consistent with the second vending information, and the first vending information or the second vending information is determined as final vending information.

In some embodiments of the present disclosure, obtaining the first vending information according to the weight change includes: determining a vending category according to a position of the product; and obtaining a vended number according to the weight change and a preset unit product weight of the vending category.

In some embodiments of the present disclosure, each shelf is provided with at least one tray, each tray has a set identifier with at least one weighing device at a bottom thereof, and is configured to place a product of a predetermined category. The obtaining the first vending information according to the weight change includes: obtaining a vending category according to the set identifier of the tray; and obtaining a vended number according to the weight change of the product on the tray before and after vending and a preset unit product weight of the vending category corresponding to the tray.

To achieve the above objectives, embodiments of a second aspect of the present disclosure provide a non-transitory computer readable storage medium having a computer program stored therein that, when executed, causes the vending method for the vending machine to be implemented.

The non-transitory computer readable storage medium according to embodiments of the present disclosure is capable of determining whether a product is misplaced or replaced by implementing the vending method for the vending machine as described above, without relying on the RFID tag, thereby guaranteeing the benefits of merchants and users.

In order to achieve the above objectives, embodiments of a third aspect of the present disclosure provide a vending machine. The vending machine includes: a machine body, a door body, and at least one shelf installed inside the machine body; a weighing device, disposed at a bottom of the shelf and configured to acquire weight of a product on the shelf before and after vending; a processing device, connected to the weighing device and configured to calculate a weigh change between the weight of the product on the shelf before vending and the weight of the product on the shelf after vending, and issue a prompt control signal when the weigh change is less than a first weight change threshold, in which the first weight change threshold is less than or equal to zero; and a prompting device, connected to the processing device and configured to issue an alarm prompt according to the prompt control signal.

The vending machine according to embodiments of the present disclosure does not rely on an RFID tag of the product. With the vending machine of the present disclosure, the weight of the product on the shelf before and after vending is acquired through the weighing device, whether there is a product being misplaced or replaced is determined by the processing device according to the weight change of the product before and after vending, and the alarm prompt is issued in time by the prompting device, so that the correct execution of a subsequent vending process may be ensured, the benefits of merchants and users may be guaranteed. Moreover, the vending machine of the present disclosure has low costs, and is easy to popularize.

In some embodiments of the present disclosure, the vending machine further includes an imaging device. The imaging device is connected to the processing device and configured to capture images of the product on the shelf before and after vending. The processing device is further configured to detect and confirm according to the images before and after vending that the product on the shelf increases, and to issue the prompt control signal.

In some embodiments of the disclosure, the processing device is further configured to obtain first vending information according to the weight change when the weight change is greater than a second weight change threshold, detect and confirm according to the images before and after vending that the product on the shelf decreases, obtain second vending information according to a change of the images, and issue the prompt control signal when the first vending information is inconsistent with the second vending information, in which the second weight change threshold is greater than or equal to zero.

In some embodiments of the disclosure, the processing device is further configured to determine the first vending information or the second vending information as final vending information when the first vending information is consistent with the second vending information.

In some embodiments of the present disclosure, the vending machine further includes an infrared sensing device. The infrared sensing device is disposed in the machine body and connected to the processing device. The processing device is configured to control the weighing device and the imaging device to start when the infrared sensing device detects that a hand leaves; or the processing device is configured to control the weighing device and the imaging device to start when a door opening signal or a door closing signal is detected.

In some embodiments of the present disclosure, each shelf is provided with at least one tray, wherein each tray has a set identifier with at least one weighing device at a bottom thereof, and is configured to place a product of a predetermined category, and the weighing device is configured to acquire the weight of the product on the respective tray.

In some embodiments of the present disclosure, the vending machine further includes a user information reading device. The user information reading device is connected to the processing device, and configured to read user information.

In some embodiments of the present disclosure, the vending machine further includes a monitoring device. The monitoring device is installed outside the machine body and configured to monitor a use environment of a user.

In some embodiments of the present disclosure, the monitoring device includes an imaging module and a triggering module. The imaging module is connected to the processing device and configured to acquire user and environment images when a triggering signal is detected. The triggering module is connected to the imaging module and configured to issue the triggering signal when a triggering instruction from the user is detected.

In order to achieve the above objectives, embodiments of a fourth aspect of the present disclosure provide a vending system. The vending system includes a vending machine and a server. The vending machine includes: a machine body, a door body, and at least one shelf installed inside the machine body; a weighing device, disposed at a bottom of the shelf and configured to acquire weight of a product on the shelf before and after vending; an imaging device, configured to capture images of the product on the shelf before and after vending; a communicating device, configured to upload the weight and the images of the product on the shelf before and after vending; a processing device, connected to the weighing device, the imaging device and the communicating device, respectively; and a prompting device, connected to the processing device and configured to issue an alarm prompt according to a prompt control signal. The server is configured to obtain first vending information according to a weight change of the product on the shelf before and after vending, identify the images of the product on the shelf before and after vending to obtain second vending information, determine final vending information according to the first vending information and the second vending information, and issue the prompt control signal when it is confirmed that the product on the shelf increases after vending.

The vending system according to embodiments of the present disclosure is based on the vending machine and the server, but does not rely on the RFID tag of the products. With the vending system according to embodiments of the present disclosure, whether a product is misplaced or replaced is determined according to the weight change of the product before and after vending and the image recognition, and the alarm prompt is issued in time by the prompting device, so that the correct execution of the subsequent vending process may be ensured, the benefits of merchants and users may be guaranteed. Moreover, the vending system has low cost, and is easy to popularize.

Figure 1:
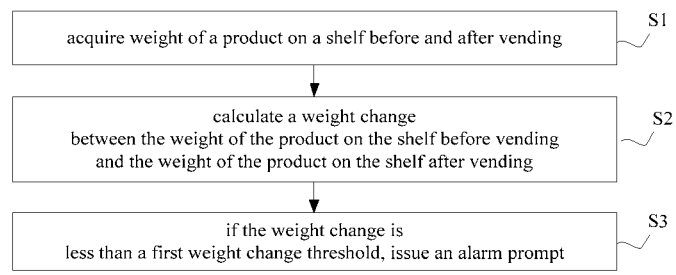
FIG. 1 is a flow chart of a vending method for a vending machine according to an embodiment of the present disclosure.

REFERENCE NUMERALS vending system 1000;

vending machine 100 and server 200;

machine body 10, door body 20, shelf 30, weighing device 40, prompting device 50, processing device 60, imaging device 70, infrared sensing device 80, user information reading device 90, monitoring device 91, tray 31;

lock 12, power supply module 14, communicating module 15, switch module 16, load control device 17;

imaging module 911 and triggering module 912.

DETAILED DESCRIPTION

Embodiments of the present disclosure will be described in detail below, examples of which are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit the present disclosure.

A vending method for a vending machine according to embodiments of a first aspect of the present disclosure will be described below with reference to accompanying drawings. In embodiments of the present disclosure, the vending machine includes a machine body, a door body, at least one shelf, a weighing device and an imaging device installed inside the machine body. Products may be placed on the shelf. Alternatively, the shelf may be provided with a tray, and a product may be placed on a corresponding tray. In some embodiments, products of a same category need to be placed at a uniform position, such as a predetermined shelf or a predetermined tray.

FIG. 1 is a flow chart of a vending method for a vending machine according to an embodiment of the present disclosure. As shown in FIG. 1, the vending method for the vending machine according to embodiments of the present disclosure includes the followings.

At S1, weight of a product on the shelf is acquired before and after vending.

In some embodiments, a user may unlock the vending machine through a code scanning or other ways. The vending machine acquires user information through a user information reading module. A server checks the user information, and sends an unlocking instruction to the vending machine after confirmation. A main control module of the vending machine controls a lock to open after receiving the unlocking instruction. At the moment, the user may select products, after selection, the user actively closes the door of the vending machine. The main control module controls the lock to close after detecting a door closing signal, and performs product identification and payment control, etc.

Specifically, the weight of the product on each shelf is acquired through the weighing device and transmitted to a processing device. The processing device records the weight of the product on the shelf before the product is taken away by the user and records the weight of the product on the shelf after the product is taken away by the user. For the case that the shelf is installed with the tray, the weight of the product on each tray is acquired before and after the product is taken away by the user.

At S2, a weight change between the weight of the product on the shelf before vending and the weight of the product on the shelf after vending is calculated.

In some embodiments of the present disclosure, for the case that the products are classified and directly placed on the shelves, the weight change of the product on each shelf before and after vending is obtained, and for the case that the shelf is installed with the tray, the weight change of the product on each tray before and after vending may be obtained.

At S3, if the weight change is less than a first weight change threshold, an alarm prompt is issued.

The first weight change threshold is less than or equal to zero, i.e., the weight of the product on the shelf after vending is greater than the weight of the product on the shelf before vending, that means the weight of the product on the shelf increases after vending.

In embodiments of the present disclosure, if the weight change of the product on the shelf before and after vending is less than the first weight change threshold, it is determined that the user places a product not belonging to a certain shelf or tray on the shelf or tray, it is possible that a product belonging to other shelves or trays is misplaced by the user on the shelf or tray, it is also possible that a new product is placed on the shelf or tray by the user. At the moment, the alarm prompt is issued to prompt the user to move the product to a correct position. Meanwhile, alarm information may be sent to a backstage staff, so that the staff may call the whole-process video after the door is opened, and further confirm whether the user has bad behaviors, such as intentionally damaging or replacing the product and the like.

With the vending method for the vending machine according to embodiments of the present disclosure, whether there is a product being misplaced or replaced is determined based on the weight change of the product before and after vending, without relying on an RFID tag of the product, and the alarm prompt is issued in time, so that the correct execution of a subsequent vending process may be ensured, and benefits of merchants and users are guaranteed. Moreover, the vending method is simple and easy to popularize.

Figure 2:
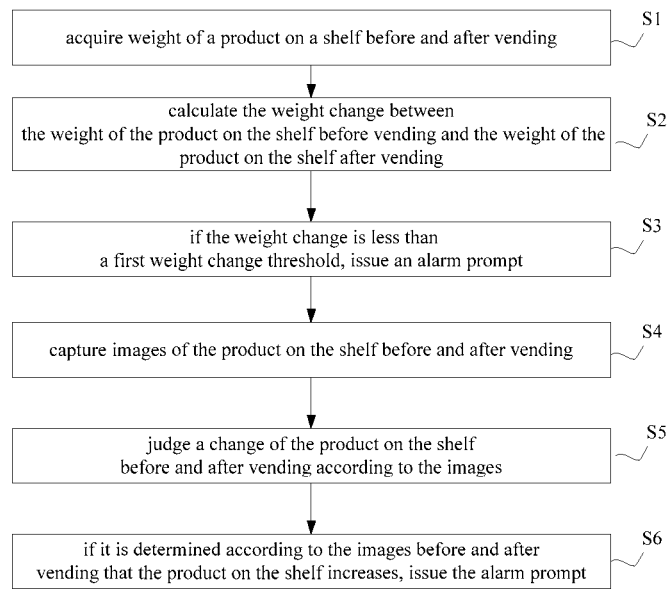
FIG. 2 is a flow chart of a vending method for a vending machine according to an embodiment of the present disclosure.

In some embodiments of the present disclosure, the vending machine may further be provided with the imaging device, which may be installed in the machine body, and configured to capture images of the product on the shelf. As shown in FIG. 2, the vending method for the vending machine according to embodiments of the present disclosure further includes the following.

At S4, images of the product on the shelf are captured before and after vending.

Specifically, images of the inside of the machine body are captured through the imaging device, so as to record the images of the product on the shelf before and after the product is taken away by a user.

At S5, a change of the product on the shelf before and after vending is judged according to the images.

Specifically, the images are recognized, and it may be determined whether the product on the shelf increases, decreases or does not change after vending according to the images before and after vending, and when the image is changed after vending, related information of the changed product may be recognized, such as a color, a category, a name, a volume, a number.

At S6, if it is determined according to the images before and after vending that the product on the shelf increases, the alarm prompt is issued.

For example, after receiving a work instruction, the imaging device starts its imaging function to record the image of the product on each of for example $1^{st}$ to $m^{th}$ shelves after vending, respectively, and numbers the obtained images as D1, D2, D3, . . . , Dm. Images before the product is taken away by the user, i.e., images of the m shelves obtained last time and respectively numbered for example as C1, C2, C3, . . . , Cm, are called, recognized and compared with the images of the products on the m shelves after vending, respectively, to determine whether the respective products on the m shelves are changed, and if yes, it is further determined whether the respective products on the m shelves increases or decreases. If it is determined according to the images before and after vending that the product on a certain shelf increases, indicating that a product is possibly misplaced by the user, for example, the user places a product not belonging to the $m^{th}$ shelf on the $m^{th}$ shelf, and the misplaced product possibly belongs to other shelves, or possibly is a new product put by the user. At the moment, the alarm prompt is issued to prompt the user that a wrong product is placed on the $m^{th}$ shelf, so as to facilitate the user to place the product to a correct position, and ensure the subsequent vending process to be correctly executed, thereby guaranteeing the benefits of the user. Meanwhile, the alarm information may be sent to the backstage staff, so that the backstage staff may call the whole-process video after the door is opened, and further confirm whether the user has bad behaviors, such as intentionally damaging or replacing the product and the like, thereby guaranteeing the benefits of the merchant.

In some embodiments of the present disclosure, if the weight change (for example set as δn) of the product on the shelf before and after vending is within a defined range which indicates that the product on the shelf is unchanged before and after vending, for example, the weight change meets $-Kn \leq \delta n \leq Kn$, where $-Kn$ may be the first weight change threshold, and Kn may be a second weight change threshold, it is determined that the user does not take the product away from the shelf. Alternatively, if it is determined that the product is not changed according to the images of the product on the shelf before and after vending, it is considered that the user does not take the product away from the shelf.

In some embodiments of the present disclosure, the misplacement or replacement of the product may also be determined by a combination of the weighing with the image recognition, as described in the following embodiments.

In some embodiments of the present disclosure, if the weight change of the product on the shelf before and after vending is greater than the second weight change threshold, where the second weight change threshold is greater than or equal to zero, i.e., the product decreases, it is considered that the user took away some of the product on the shelf, and first vending information may be obtained based on the weight change. In some embodiments of the present disclosure, it is provided that products are placed on the shelves or trays in advance by category, and thus a vending category may be determined according to a position of a product. For example, based on the shelf or tray on which the product is placed, related information corresponding to the product on the shelf or tray, such as the category, the unit product weight, the unit price and the like, may be obtained from prestored information, that is, the vending category can be determined based on the position where the weight change occurs. Further, the vended number is obtained according to the weight difference and the preset unit product weight of the vending category. Specifically, a quotient of the weight difference and the preset unit product weight of the vending category is the number of the vended products. Furthermore, in order to avoid a deviation of the unit weight of the product of this category, the quotient may be rounded to its integral value.

In some embodiments of the present disclosure, for the case that the shelf is provided with the tray, each shelf may be provided with at least one tray, and each tray has a set identifier, and is provided with at least one weighing device at a bottom thereof, and is configured to place a product of a predetermined category. The first vending information may be obtained by the followings. The weighing devices detect the current weight values of the trays, which are set for example as B1, B2, B3, . . . , Bn. The set identifiers of these trays are 1 to m, respectively. The weight values of the trays before vending are recalled, which are set for example as A1, A2, . . . , An. The weight difference between the weight of the product on the $n^{th}$ tray before vending and the weight of the product on the $n^{th}$ tray after vending is calculated, e.g. $\delta n = An - Bn$, where n is less than or equal to the total number of the trays. If the weight difference is greater than a first limit value corresponding to the $n^{th}$ tray, where the first limit value is greater than zero, indicating that the weight of product on the $n^{th}$ tray decreases after vending, then it is determined that the user purchases the product on the tray with the set identifier being n. The relevant information of the products placed on each tray is prestored, and the vending category may be obtained according to the set identifier of the $n^{th}$ tray. Further, the vended number is obtained according to the weight change of the product on the respective tray before and after vending and the preset unit product weight of the vending category corresponding to the tray, and the vended number is the number of the product of the category purchased by the user, which meets: $Xn = Zn/\delta n$, where Xn is the vended number, and Zn is the preset unit product weight of the vending category. In order to avoid the deviation of the unit product weight, Xn may be rounded to its integer value. The weight information of each tray is processed as above to determine the products purchased by the user.

In some embodiments of the present disclosure, if it is determined from the images before and after vending that the product on the shelf decreases, second sale information is obtained according to a change of the images. Specifically, if the product decreases, it is determined that the user took the product away from for example the $m^{th}$ shelf, and the category and the number of the decreased product, for example including but not limited to the color, the category, the name, the volume, the number and the like of the product, i.e., the related information of the product purchased by the user, are obtained according to the image change.

In some embodiments of the present disclosure, if the first vending information is inconsistent with the second vending information, the alarm prompt is issued. Specifically, if the vending category and number determined according to the weight change of the product on the shelf before and after vending are inconsistent with the vending category and number obtained according to the image recognition, it is considered that a product is possibly misplaced or replaced by the user. At the moment, the alarm prompt is issued to prompt the user to move the product to a correct position, thereby ensuring the correct execution of the subsequent vending process. Meanwhile, the alarm prompt information may be sent to the backstage staff to facilitate the backstage staff to check whether the user has bad behaviors, thereby guaranteeing the benefits of the merchant.

In some embodiments of the present disclosure, the weighing and the image recognition may be combined to determine the user's purchasing information, i.e., vending information. Specifically, if the first vending information is consistent with the second vending information, the first vending information or the second vending information is determined as final vending information. Specifically, the vending information obtained by weighing is compared with the vending information obtained by the image recognition, for example, the number Xn of the decreased product on the $n^{th}$ tray of the $m^{th}$ shelf is compared with the information of the decreased product determined by the image recognition to determine whether they are consistent, if the first vending information is consistent with the second vending information, it is determined that the user took away the product on the $n^{th}$ tray of the $m^{th}$ shelf, and the vended number is Xn. Then, the category, the number, and the total price of the product purchased by the user are output, wherein the total price meets:

$$Q = \sum_{i=1}^{n} Si \cdot Ki,$$

where Si is the number of the $i^{th}$ product, Ki is a unit price of the $i^{th}$ product, and n is the total number of the trays, and the server is informed to do the settlement.

In some embodiments of the present disclosure, for the computation process including the number calculation of the product and the image recognition and comparison, it is possible that data information, after obtained locally, is sent to the server, after the number calculation and the image recognition are performed through a cloud, the vending category and the data information are sent to a payment system, and after the money deduction is performed, the product category, the number and the price are sent to the local for output. Alternatively, it is also possible that the computation process including the number calculation of the product and the image recognition and comparison are performed locally, a result obtained thereby is sent to a cloud payment system, and after the money deduction is performed, the product category, the number and the price are sent to the local for output.

Figure 3:
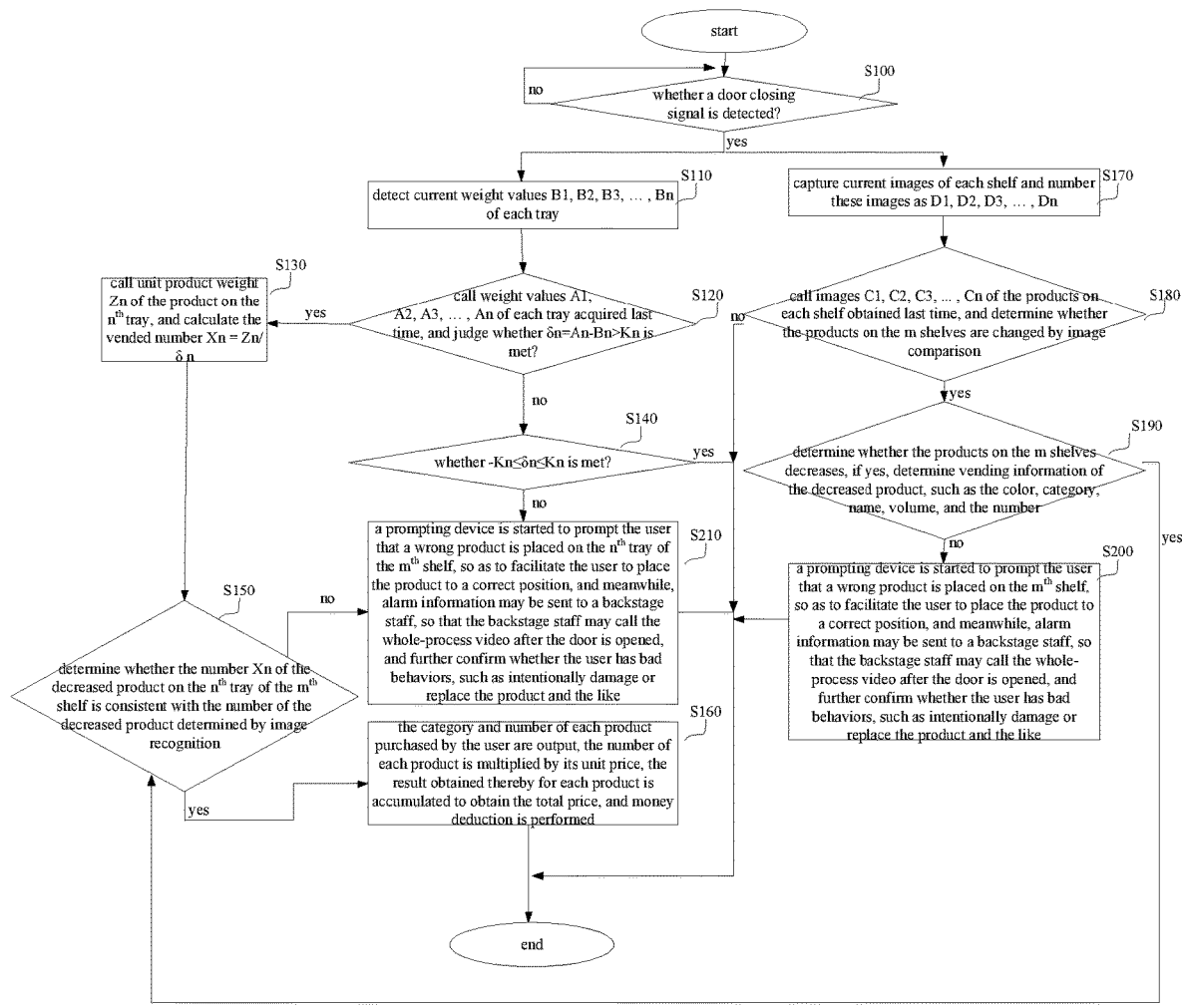
FIG. 3 is a flow chart of a vending method for a vending machine according to an embodiment of the present disclosure.

Based on the above description, as shown in FIG. 3, which is a flow chart of a vending method for a vending machine according to an embodiment of the present disclosure, the vending method includes the followings.

At S100, it is determined whether a door closing signal is detected, if yes, the steps S110 and S170 are entered, respectively, otherwise, the step S100 is continued.

At S110, current weight values B1, B2, B3, . . . , Bn of each tray are detected.

At S120, weight values A1, A2, A3, . . . , An of the each tray obtained last time are called, and it is determined whether δn=An−Bn>Kn is met, where Kn is an allowed error between standard weight Zn and measured weight of the product on each tray. If δn=An−Bn>Kn is met, the step S130 is entered, otherwise the step S140 is entered.

At S130, unit product weight Zn of the product on the $n^{th}$ tray is called, and the vended number Xn is calculated, Xn=Zn/δn.

At S140, it is determined whether −Kn≤δn≤Kn is met, if yes, the process ends, otherwise, the step S210 is entered.

At S150, it is determined whether the number Xn of the decreased product on the $n^{th}$ tray of the $m^{th}$ shelf is consistent with the number of the decreased product determined by image recognition, if yes, the step S160 is entered, otherwise, the step S210 is entered.

At S160, the category and the number of each product purchased by the user are output, the number of each product is multiplied by its unit price, the result obtained thereby for each product is accumulated to obtain the total price, and money deduction is performed.

At S170, current images of the products on each shelf are captured and numbered as D1, D2, D3, . . . , Dn.

At S180, images C1, C2, C3, . . . , Cn of the products on each shelf obtained last time are called, and it is determined by image comparison whether the products on m shelves are changed, if yes, the step S190 is entered, otherwise, the process ends.

At S190, it is determined whether the products on the m shelves decreases, if yes, vending information such as the color, the category, the name, the volume, the number and the like of the decreased product is determined, and the step S150 is entered. Otherwise, the step S200 is entered.

At S200, a prompting device is started to prompt the user that a wrong product is placed on the $m^{th}$ shelf, so as to facilitate the user to move the product to a correct position, and meanwhile, alarm information may be sent to a backstage staff, so that the backstage staff may call the whole-process video after the door is opened, and further confirm whether the user has bad behaviors, such as intentionally damaging or replacing the product and the like.

At S210, a prompting device is started to prompt the user that a wrong product is placed on the $n^{th}$ tray of the $m^{th}$ shelf, so as to facilitate the user to move the product to a correct position, and meanwhile, alarm information may be sent to a backstage staff, so that the backstage staff may call the whole-process video after the door is opened, and further confirm whether the user has bad behaviors, such as intentionally damaging or replacing the product and the like.

According to the vending method for the vending machine as described in embodiments of the present disclosure, the weight change of the product is detected by the weighing device, price calculation may be performed automatically, at the same time, the images of the product are captured by the imaging device, a supplementary inspection is performed through the image recognition, the misplacement or replacement of the product may be judged and found in time, so as to avoid a loss of the merchants. Moreover, the vending method is safe, reliable, simple and easy to implement, and improves the user experience.

Some embodiments of the present disclosure also provide a non-transitory computer readable storage medium, having a computer program stored therein that, when executed, causes the vending method for the vending machine according to embodiments of the first aspect of the present disclosure to be implemented.

A vending machine according to embodiments of a second aspect of the present disclosure is described below with reference to the accompanying drawings.

Figure 4:
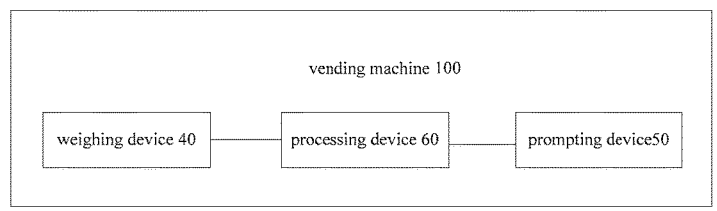
FIG. 4 is a block diagram of a vending machine according to an embodiment of the present disclosure.
Figure 5:
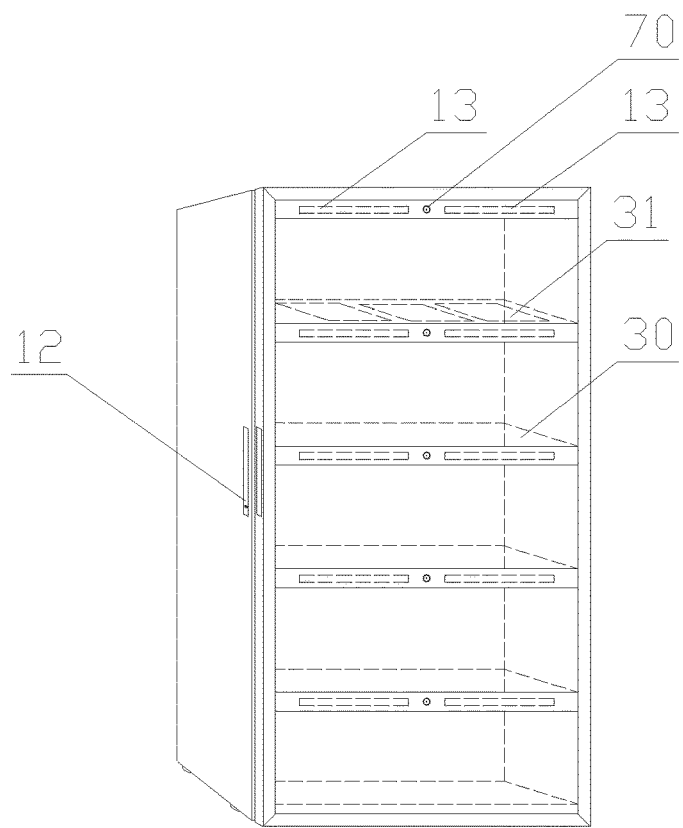
FIG. 5 is a front view of a vending machine according to an embodiment of the present disclosure.
Figure 6:
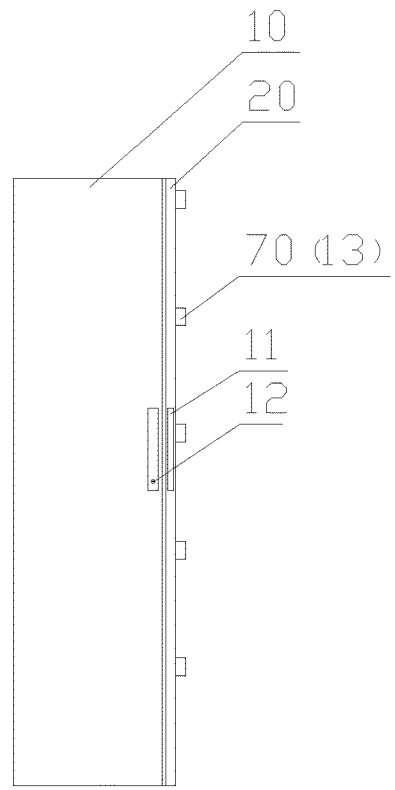
FIG. 6 is a side view of the vending machine as shown in FIG. 5.

FIG. 4 is a block diagram of a vending machine according to an embodiment of the present disclosure, FIG. 5 is a front view of a vending machine according to an embodiment of the present disclosure, and FIG. 6 is a side view of the vending machine as shown in FIG. 5. Referring to FIG. 4 to FIG. 6, the vending machine 100 according to some embodiments of the present disclosure includes a machine body 10, a door body 20, at least one shelf 30 installed in the machine body 10, a weighing device 40, a prompting device 50, and a processing device 60. The door body 20 may be transparent for convenient to see products in the machine body 10. The vending machine 100 further includes a door handle 11 and a lock 12. The door handle 11 is installed on the door body 20 and configured to open and close the door body 20. The lock 12 is controlled by the processing device 60 and configured to keep the door body closed, a main part of the lock 12 is installed on the machine body 10, and a lock catch is installed on the door body 20.

The weighing device 40 is disposed at a bottom of the shelf 30 and configured to acquire weight of a product on the shelf 30 before and after vending. The processing device 60 is connected to the weighing device 40, and configured to calculate a weight change between the weight of the product on the shelf 30 before vending and the weight of the product on the shelf 30 after vending, and to issue a prompt control signal when the weight change is less than a first weight change threshold, where the first weight change threshold is less than or equal to zero, that is, the weight of the product on the shelf after vending is greater than the weight of the product on the shelf before vending, that means the weight of the product on the shelf increases after vending.

The prompting device 50 is connected to the processing device 60 and configured to issue an alarm prompt according to the prompt control signal.

In embodiments of the present disclosure, if the weight change of the product on the shelf before and after vending is less than the first weight change threshold, it is determined that the user placed a product not belonging to a certain shelf or tray on the shelf or tray, it is possible that a product belonging to other shelves or trays is misplaced by the user on the shelf or tray, it is also possible that a new product is placed on the shelf or tray by the user. At the moment, the alarm prompt is issued to prompt the user to move the product to a correct position. Meanwhile, alarm information may be sent to a backstage staff, so that the staff may call the whole-process video after the door is opened, and further confirm whether the user has bad behaviors, such as intentionally damaging or replacing the product and the like.

The vending machine 100 according to embodiments of the present disclosure does not rely on an RFID tag of the product. With the vending machine 100 of the present disclosure, the weight of the product on the shelf 30 before and after vending is acquired through the weighing device 40, whether there is a product being misplaced or replaced is determined by the processing device 60 according to the weight change of the product before and after vending, and the alarm prompt is issued in time by the prompting device 50, so that the correct execution of a subsequent vending process may be ensured, the benefits of merchants and users may be guaranteed. Moreover, the vending machine 100 of the present disclosure has low costs, and is easy to popularize.

In some embodiments of the present disclosure, as shown in FIG. 5 or FIG. 6, the vending machine 100 according to embodiments of the present disclosure further includes an imaging device 70 connected to the processing device 60 and configured to capture images of the product on the shelf before and after vending. The processing device 60 is further configured to determine a change of the product on the shelf 30 before and after vending according to the images, and to issue a prompt control signal when it is determined according to the images before and after vending that the product on the shelf 30 increases, and the prompting device 50 issues an alarm prompt. Specifically, when it is determined according to the images before and after vending that the weight of the product on the shelf 30 increases, it is considered that a product is misplaced or replaced by the user or the user performs other bad actions, and at the moment, the alarm prompt is issued in time, so as to avoid the loss of the merchants and improve the shopping safety.

In some embodiments of the present disclosure, the processing device 60 is further configured to determine that the user took away the product on the shelf 30 when the weight change of the product on the shelf 30 before and after vending is greater than a second weight change threshold, where the second weight change threshold is greater than or equal to zero, that is, the weight of the product decreases, and to obtain first vending information according to the weight change. Specifically, in some embodiments, it is provided that products are placed on the shelves 30 or trays in advance by category, and thus a vending category may be determined according to a position of a product. For example, based on the shelf 30 or tray on which the product is placed, related information corresponding to the product on the shelf 30 or tray, such as the category, the unit product weight, the unit price and the like, may be obtained from prestored information, that is, the vending category can be determined based on the position where the weight change occurs. Further, the vended number is obtained according to the weight difference and the preset unit product weight of the vending category. Specifically, a quotient of the weight difference and the preset unit product weight of the vending category is the number of the vended products. Furthermore, in order to avoid a deviation of the unit weight of the product of this category, the quotient may be rounded to its integral value.

In some embodiments of the present disclosure, for the case that the shelf 30 is provided with the tray, as shown in FIG. 5, each shelf 30 is provided with at least one tray 31, and each tray 31 has a set identifier with at least one weighing device 40 at a bottom thereof, and is configured to place a product of a predetermined category.

Figure 7:
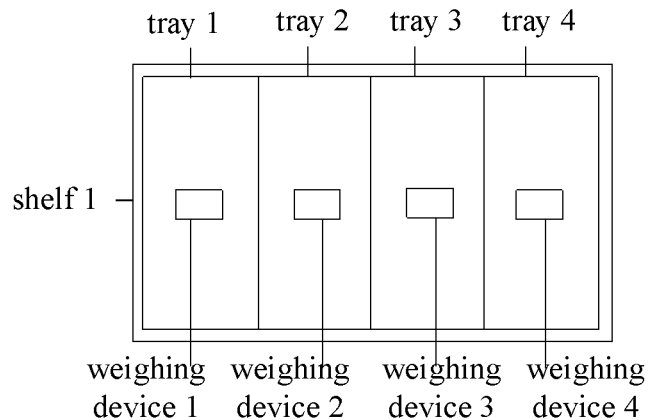
FIG. 7 is a schematic diagram of weighing products on trays according to an embodiment of the present disclosure.

FIG. 7 is a schematic diagram of weighing products on trays by weighing devices according to an embodiment of the present disclosure. As shown in FIG. 7, at least one tray 31 is provided on each shelf 30, for example, the shelf 1 is provided with four trays numbered as tray 1 to tray 4, and each tray 31 is provided with at least one weighing device 40 (such as a pressure sensor) at a bottom thereof, for example, the weighing device 1 to the weighing device 4 are included. Each tray 31 is only allowed to have the product of the same category and weight, but not allowed to have products of the same weight but different categories. Measured weight of different products of the same category is allowed to have an error $K_n$, where $K_n$ is an allowed error between standard weight Zn and the measured weight of the product on each tray 31, and 0≤Kn≤Zn, where Zn is the standard weight preset for a single product in the tray 31 with a serial number n, and the value of Kn may be set according to specific conditions, or may not be set, for example, Kn may be defaulted to be 0.

The processing device 60 prestores the relevant information of the product placed on each tray 31, the vending category may be obtained according to the set identifier of the $n^{th}$ tray; and the vended number may be obtained based on the weight change of the product on each tray 31 before and after vending and the preset unit product weight of the vending category corresponding to the tray, in which the vended number is the number of the product of the category purchased by the user.

In some embodiments, the processing device 60 is further configured to obtain second vending information based on a change of the images before and after vending when it is determined according to the images that the product on the shelf decreases. Specifically, if the product decreases, it is determined that the user took some of the product away from the $m^{th}$ shelf, and the category and the number of the decreased product, for example including but not limited to the color, the category, the name, the volume, the number and the like of the product, i.e., the related information of the product purchased by the user, are obtained according to the change of the images.

In some embodiments of the present disclosure, the processing device 60 is further configured to issue a prompt control signal when the first vending information is inconsistent with the second vending information. Specifically, if the vending category and number determined according to the weight change of the product on the shelf before and after vending are inconsistent with the vending category and number obtained according to the image recognition, it is considered that a product is possibly misplaced or replaced by the user. At the moment, the alarm prompt is issued to prompt the user to move the product to a correct position, thereby ensuring the correct execution of the subsequent vending process. Meanwhile, the alarm prompt information may be sent to the backstage staff to facilitate the backstage staff to check whether the user has bad behaviors, thereby guaranteeing the benefits of the merchant.

In some embodiments, the processing device 60 is further configured to determine the first vending information or the second vending information as final vending information when the first vending information is consistent with the second vending information. Specifically, the vending information obtained by weighing is compared with the vending information obtained by the image recognition, for example, the number Xn of the decreased product on the $n^{th}$ tray of the $m^{th}$ shelf is compared with the information of the decreased product determined by the image recognition to determine whether they are consistent, if the first vending information is consistent with the second vending information, it is determined that the user took away the product on the $n^{th}$ tray of the $m^{th}$ shelf, and the vended number is Xn. Then, the category, the number, and the total price of the product purchased by the user are output, wherein the total price meets:

$$Q = \sum_{i=1}^{n} Si \cdot Ki,$$

where Si is the number of the $i^{th}$ product, Ki is a unit price of the $i^{th}$ product, and n is the total number of the trays, and the server is informed to do the settlement.

Figure 8:
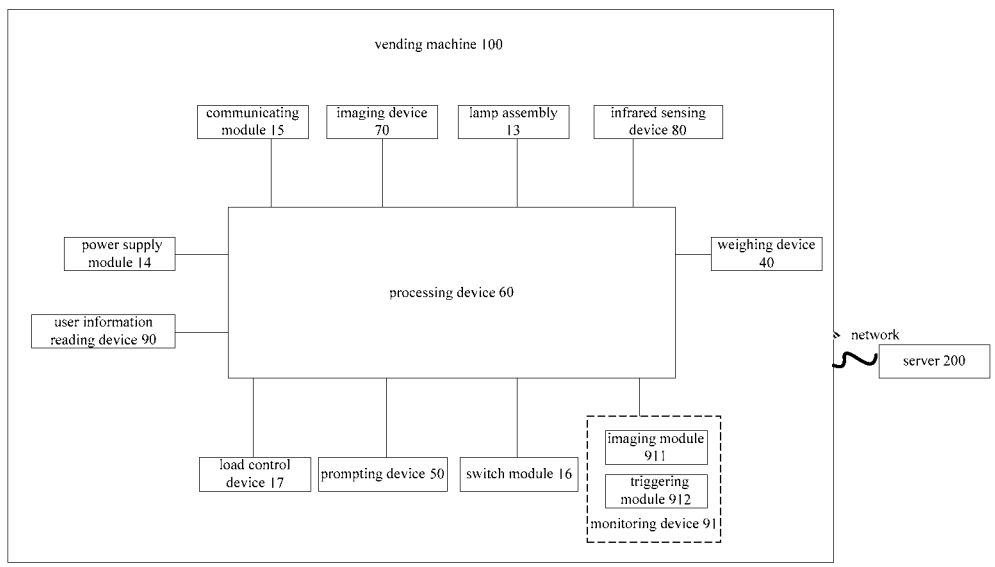
FIG. 8 is a block diagram illustrating communication of a vending machine with a server according to an embodiment of the present disclosure.

In some embodiments of the present disclosure, as shown in FIG. 8 which is a block diagram of a vending machine according to an embodiment of the present disclosure, the vending machine 100 further includes an infrared sensing device 80 disposed in the machine body 10. The infrared sensing device 80 is connected to the processing device 60, and the processing device 60 is configured to control the weighing device 40 and the imaging device 70 to start when the infrared sensing device 80 detects that a hand leaves. Alternatively, the processing device 60 is configured to control the weighing device 40 and the imaging device 70 to start when a door opening signal or a door closing signal is detected.

In some embodiments, when a triggering signal for starting the imaging device 70 is the door closing signal, a static image may be captured and uploaded to the processing device 60, and the processing device 60 performs image processing to compare the static images of each shelf 30 captured at two consecutive door closing signals, so as to confirm the product taken away by the user. If the triggering signal for starting the imaging device 70 is the door opening signal, when the door opening signal is detected, the imaging device 70 may dynamically shoot a video to monitor the behaviors of the user during shopping, and when an alarm signal is issued, it is confirmed whether there are bad behaviors, such as damaging or replacing the product and the like, so as to check the reason of the alarm.

In some embodiments, the imaging device 70 is disposed inside the door body 20, and is configured to capture the image or video of the product on the shelf 30, and may also be configured to monitor the user's behavior after the door body 20 is opened. At least one imaging device 70 may be disposed at the position of each shelf 30 corresponding to the door body or disposed above the shelf 30, or disposed at a left side, a right side, an upper right corner or an upper left corner of the shelf 30. Alternatively, the images of the products on several shelves may be captured by one imaging device 70.

In some embodiments of the present disclosure, steps of the weight change determination and the image comparison may be performed simultaneously, or their order may be adjusted. For example, the image or video is taken when the door is opened, and the image is taken and the weight change is detected when the door is closed. Alternatively, the image is taken and the weight change is detected simultaneously when the door is closed. Alternatively, the weight change is firstly detected after the door is closed, and if the weight change occurs, the result of the image recognition is checked to determine whether an image change occurs. Alternatively, the image change is firstly determined through the image recognition, and then the weight change is called to determine the change of the number.

In some embodiments, as shown in FIG. 8, the vending machine 100 further includes a user information reading device 90. The user information reading device 90 is connected to the processing device 60 and configured to read user information to facilitate the payment. For example, a two-dimensional code is scanned by using an intelligent mobile terminal. Alternatively, biological information of the user, such as fingerprint information, palm print information, palm vein information, finger vein information, iris information or face information of the user, is collected.

In some embodiments of the present disclosure, as shown in FIG. 8, the vending machine 100 of the present disclosure further includes a monitoring device 91, and the monitoring device 91 is installed outside the machine body 10 and configured to monitor a use environment of the user. Specifically, as shown in FIG. 8, the monitoring device 91 may include an imaging module 911 and a triggering module 912. The imaging module 911 is connected to the processing device 60, and configured to acquire user and environment images when a trigger signal is detected. The triggering module 912 is connected to the imaging module 911, and configured to issue the triggering signal when a triggering instruction from the user is detected. In some embodiments, the triggering module 912 may include at least one of an infrared sensor, a voice recognition module, and a triggering module.

As an example, the imaging module 911 is installed outside the machine body 10, and starts to work in cooperation with the triggering module. For example, if the signal for triggering the imaging module 911 to work is an infrared sensor, when the infrared sensor detects that a person arrives, the imaging module 911 is started to perform face recognition. If the signal for triggering the imaging module 911 to work is a voice recognition module, when a person comes in front of the machine body 10 to wake up the system by a certain keyword, the voice recognition, the face recognition, or the image capture is performed. If the signal for triggering the imaging module 911 to work is a button, the voice recognition, the face recognition, or the image capture is performed when a person presses the button.

In some embodiments of the present disclosure, referring to FIG. 4 to FIG. 8, the vending machine 100 may further include a lamp assembly 13, a power supply module 14, a communicating module 15, a switch module 16, and a load control device 17. The lamp assembly 13 may be composed of a plurality of groups of lamps and configured to supplement light when the light is insufficient in the shooting process of the imaging device 70. The power supply module 14 is configured to supply power. The communicating module 15 is configured to transmit data. The load control device 17 is connected to the processing device 60, i.e., the main control module of the vending machine 100, and may control the on-off of the lock 12, the lamps and the imaging device 70, and control the work of electric devices of a refrigeration system. The processing device 70 may communicate with a cloud server 200 via a network.

In summary, as compared with a common vending machine, the vending machine 100 according to embodiments of the present disclosure has many advantages. For example, a plurality of products can be taken from the vending machine 100 at a time, its operation is simple for a user and it brings good experience to the user. As compared with the RFID tag identification, the vending machine 100 is low in cost, may provide convenience for the user, and saves cost for the merchant.

Figure 9:
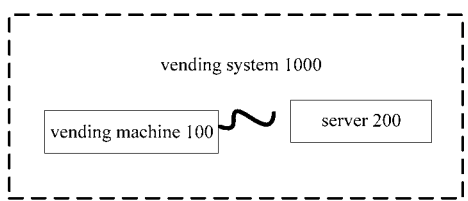
FIG. 9 is a block diagram of a vending system according to an embodiment of the present disclosure.

In some embodiments of the present disclosure, processes like data computation and image recognition may be implemented locally by the processing device of the vending machine, such as the vending machine as described in the above embodiments of the second aspect, or may be implemented by the server. FIG. 9 is a schematic diagram of a vending system according to an embodiment of the present disclosure. As shown in FIG. 9, the vending system 1000 according to embodiments of the present disclosure includes a vending machine 100 and a server 200.

The vending machine 100 includes a machine body, a door body, at least one shelf installed in the machine body, a weighing device, an imaging device, a communicating device, a processing device and a prompting device. The weighing device is disposed at a bottom of the shelf and configured to acquire weight of a product on the shelf before and after vending. The imaging device is configured to capture images of the product on the shelf before and after vending. The processing device is connected to the weighing device, the imaging device and the communicating device, respectively. The communicating device is configured to upload the weight of the product on the shelf before and after vending and the images of the product on the shelf before and after vending. The prompting device is connected to the processing device and configured to issue an alarm prompt according to a prompt control signal.

The server 200 is configured to obtain first vending information according to a weight change of the product on the shelf before and after vending, and identify the images of the product on the shelf before and after vending to obtain second vending information, determine final vending information according to the first vending information and the second vending information, and issue a prompt control signal when it is determined that the product on the shelf increases after vending, so as to draw attention to the misplacement or replacement of the product in time, thereby ensuring the correct execution of the subsequent vending process and guaranteeing the benefits of merchants and users. Moreover, the vending system has low costs, and is easy to popularize.

In addition, with the vending system 1000 according to embodiments of the present disclosure, the user can open the door by scanning a code and select the products at will, and the products may be paid through safe and convenient non-secret payment, thereby achieving a simple transaction, a convenient use and a good experience. Moreover, the system may automatically identify and transact without changing a shopping habit of the user, without making modification to the products or attaching labels to the products, and without additionally increasing the cost of the products. The vending information is automatically accounted through the weighing device, and an auxiliary confirmation is carried out through the image recognition, by such a double determination, the transaction is safer and more reliable.

The vending system 1000 according to embodiments of the present disclosure is based on the vending machine 100 and the server 200, but does not rely on the RFID tag of the products. With the vending system according to embodiments of the present disclosure, whether a product is misplaced or replaced is determined according to the weight change of the product before and after vending and the image recognition, and the alarm prompt is issued in time by the prompting device, so that the correct execution of the subsequent vending process may be ensured, the benefits of merchants and users may be guaranteed. Moreover, the vending system 1000 has low cost, and is easy to popularize.

It should be noted that, in the description of the present disclosure, any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

The logic and/or step shown in the flow chart or described in other manners herein, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or combination thereof. In the above embodiments, a plurality of steps or methods may be realized by software or firmware stored in the memory and executed by an appropriate instruction execution system. For example, if it is realized by the hardware, likewise in another embodiment, it may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, and for those skilled in the art, changes, modifications, alternatives, and variations can be made to the embodiments within the scope of the present disclosure.

What is claimed is:

1. A vending method for a vending machine, the vending machine including a machine body, a door body, at least one shelf installed inside the machine body, an infrared sensing device disposed in the machine body, an imaging device, and a weighing device, and the vending method comprising:
   acquiring a weight of a product on the shelf before and after a vending operation; and
   issuing an alarm prompt in response that it is determined that a weight change is less than a first weight change threshold, wherein the weight change is a difference between the weight of the product on the shelf before vending operation and the weight of the product on the shelf after vending operation, and the first weight change threshold being less than or equal to zero;
   capturing images of the product on the shelf before and after the vending operation;
   issuing an alarm prompt in response to that it is determined according to the images before and after the vending operation that the product on the shelf increases;
   controlling the weighing device and the imaging device to start operation in response to that the infrared sensing device detects that a hand leaves; and
   controlling the weighing device and the imaging device to start operation in response to a door opening signal or a door closing signal is detected.

2. The vending method according to claim 1, comprising:
   determining that the weight change is greater than a second weight change threshold, and obtaining first vending information according to the weight change, wherein the second weight change threshold is greater than or equal to zero;
   determining, based on the images before and after the vending operation, that the product on the shelf decreases;
   obtaining second vending information based on a change of the images; and
   issuing an alarm prompt in response to that it is determined that the first vending information is inconsistent with the second vending information.

3. The vending method according to claim 2, comprising:
   determining that the first vending information is consistent with the second vending information, and determining the first vending information or the second vending information as final vending information.

4. The vending method according to claim 2, wherein the obtaining the first vending information based on the weight change comprises:
   determining a vending category based on a position of the product; and
   obtaining a vended number based on the weight change and a unit weight of the product of the vending category.

5. The vending method according to claim 2, wherein each shelf is provided with at least one tray, each tray having a set identifier and configured to place a product of a predetermined category, and each shelf is provided with at least one weighing device at a bottom of the shelf; and wherein obtaining the first vending information based on the weight change comprises:
obtaining a vending category based on the set identifier of the tray; and
obtaining a vended number based on the weight change of the product on the tray before and after the vending operation and a preset unit weight of the product of the vending category corresponding to the tray.

6. A non-transitory computer readable storage medium, having executable instructions stored therein that, when executed by a processor, configure the processor to implement acts comprising:
acquiring a weight of a product on a shelf of a vending device before and after a vending operation of the vending device;
determining a weight change between the weight before the vending operation and the weight after the vending operation; and
issuing an alarm prompt in response that it is determined that the weight change is less than a first weight change threshold, and the first weight change threshold being less than or equal to zero;
capturing images of the product on the shelf before and after the vending operation;
issuing an alarm prompt in response to that it is determined according to the images before and after the vending operation that the product on the shelf increases; and
controlling, one or more of the act of the acquiring the weight or the capturing the images in response to detecting a gesture, a door opening signal, and a door closing signal.

7. A vending machine, comprising:
a machine body, a door body, and at least one shelf installed inside the machine body;
a weighing device, disposed at a bottom of the shelf and configured to acquire weight of a product on the shelf before and after a vending operation;
a processing device, coupled to the weighing device and configured to calculate a weigh change between the weight of the product on the shelf before the vending operation and the weight of the product on the shelf after the vending operation, and issue a prompt control signal in response to the weigh change is less than a first weight change threshold, wherein the first weight change threshold is less than or equal to zero;
a prompting device, coupled to the processing device and configured to issue an alarm prompt based on the prompt control signal,
an imaging device, coupled to the processing device and configured to capture images of the product on the shelf before and after the vending operation; and
an infrared sensing device, disposed in the machine body and coupled to the processing device,
wherein:
the processing device is configured to determine based on the images before and after the vending operation that the product on the shelf increases, and to issue the prompt control signal;
the processing device is configured to control the weighing device and the imaging device to start in response to that the infrared sensing device detects that a hand leaves; and
the processing device is configured to control the weighing device and the imaging device to start in response to a door opening signal or a door closing signal is detected.

8. The vending machine according to claim 7, wherein the processing device is further configured to obtain first vending information based on the weight change in response to that the weight change is greater than a second weight change threshold, determine based on the images before and after the vending operation that the product on the shelf decreases, obtain second vending information based on a change of the images, and issue the prompt control signal in response to that the first vending information is inconsistent with the second vending information, wherein the second weight change threshold is greater than or equal to zero.

9. The vending machine according to claim 8, wherein the processing device is further configured to determine the first vending information or the second vending information as final vending information in response to the first vending information is consistent with the second vending information.

10. The vending machine according to claim 8, further comprising:
a user information reading device, coupled to the processing device, and configured to read user information.

11. The vending machine according to claim 8, further comprising:
a monitoring device, installed outside the machine body and configured to monitor a use environment of a user.

12. The vending machine according to claim 11, wherein the monitoring device comprises:
an imaging module, coupled to the processing device and configured to acquire user and environment images in response to that a triggering signal is detected; and
a triggering module, connected to the imaging module and configured to issue the triggering signal in response to that a triggering instruction from a user is detected.

13. The vending machine according to claim 7, wherein each shelf is provided with at least one tray, each tray having a set identifier and configured to place a product of a predetermined category, and each shelf is provided with at least one weighing device at a bottom of the shelf, the weighing device configured to acquire the weight of the product on the respective tray.

14. A vending system, comprising:
a vending machine, comprising:
a machine body, a door body, and at least one shelf installed inside the machine body;
a weighing device, disposed at a bottom of the shelf and configured to acquire weight of a product on the shelf before and after a vending operation;
an imaging device, configured to capture images of the product on the shelf before and after the vending operation;
a communicating device, configured to upload the weight and the images of the product on the shelf before and after the vending operation;
a processing device, coupled to the weighing device, the imaging device and the communicating device, respectively;
a prompting device, coupled to the processing device and configured to issue an alarm prompt based on a prompt control signal; and
an infrared sensing device, disposed in the machine body and coupled to the processing device, wherein the processing device is configured to control the weighing device and the imaging device to start in response to that the infrared sensing device detects that a hand leaves, and is configured to control the weighing device and the imaging device to start in response to a door opening signal or a door closing signal is detected; and a server, configured to obtain first vending information based on a weight change of the product on the shelf before and after the vending operation, identify the images of the product on the shelf before and after the vending operation to obtain second vending information, determine final vending information based on the first vending information and the second vending information, and issue the prompt control signal in response to it is determined that the product on the shelf increases after vending.

15. The vending system according to claim 14, wherein the sever is configured to determine the first vending information or the second vending information as the final vending information in response to the first vending information is consistent with the second vending information.

16. The vending system according to claim 14, wherein each shelf is provided with at least one tray, each tray having a set identifier and configured to place a product of a predetermined category, and each shelf is provided with at least one weighing device at a bottom of the shelf, the weighing device configured to acquire the weight of the product on the respective tray.

* * * * *